United States Patent
Patil et al.

(10) Patent No.: US 10,510,195 B2
(45) Date of Patent: Dec. 17, 2019

(54) SYSTEM AND METHOD FOR MONITORING STRESS CYCLES

(71) Applicant: Tesla, Inc., Palo Alto, CA (US)

(72) Inventors: Nimish Patil, Pleasanton, CA (US); Alex Green, Mountain View, CA (US)

(73) Assignee: Tesla, Inc., Palo Alto, CA (US)

( * ) Notice: Subject to any disclaimer, the term of this patent is extended or adjusted under 35 U.S.C. 154(b) by 239 days.

(21) Appl. No.: 15/637,313

(22) Filed: Jun. 29, 2017

(65) Prior Publication Data

US 2019/0005745 A1 Jan. 3, 2019

(51) Int. Cl.
| | | |
|---|---|---|
| G07C 5/08 | (2006.01) | |
| B60C 23/04 | (2006.01) | |
| G07C 5/00 | (2006.01) | |
| B60C 23/00 | (2006.01) | |
| G06F 7/00 | (2006.01) | |

(52) U.S. Cl.
CPC .......... *G07C 5/085* (2013.01); *B60C 23/0408* (2013.01); *G07C 5/006* (2013.01); *G07C 5/0816* (2013.01); *B60C 23/00* (2013.01); *G06F 7/00* (2013.01); *G07C 5/00* (2013.01); *G07C 5/008* (2013.01)

(58) Field of Classification Search
CPC .......... G07C 5/085; G07C 5/006; G07C 5/00; B60C 23/0408; B60C 23/00; G06F 7/00
See application file for complete search history.

(56) References Cited

U.S. PATENT DOCUMENTS

| | | | |
|---|---|---|---|
| 6,968,905 B2 | 11/2005 | Adnan et al. | |
| 7,448,853 B2 | 11/2008 | Mabe et al. | |
| 7,953,559 B2* | 5/2011 | Sundermeyer | G01N 3/32 702/183 |
| 2013/0283925 A1* | 10/2013 | White | G01N 3/10 73/825 |
| 2013/0311190 A1* | 11/2013 | Reiner | G10L 25/48 704/270 |
| 2016/0001657 A1 | 1/2016 | Koller et al. | |
| 2016/0024729 A1* | 1/2016 | Dinitz | E01F 9/635 248/548 |
| 2017/0023634 A1* | 1/2017 | Takehara | G01R 31/2642 |
| 2017/0249787 A1 | 8/2017 | Remboski et al. | |

* cited by examiner

*Primary Examiner* — Mary Cheung
(74) *Attorney, Agent, or Firm* — Knobbe, Martens, Olson & Bear, LLP

(57) ABSTRACT

A system for monitoring stress cycles includes memory storing a base value and an inflection value of a stress cycle and one or more processors coupled to the memory. The one or more processors are configured to receive a series of stress values from a stress sensor. For each stress value in the series of stress values, the one or more processors are configured to perform operations including performing a first comparison between the stress value and a previous stress value in the series of stress values, detecting an inflection in the series of stress values based on the first comparison, updating the base value and the inflection value in response to detecting the inflection, performing a second comparison between the stress value and the base value, determining whether the stress cycle is complete based on the second comparison, and recording the stress cycle in response to determining that the stress cycle is complete.

20 Claims, 12 Drawing Sheets

SYSTEM AND METHOD FOR MONITORING STRESS CYCLES

TECHNICAL FIELD

The present disclosure is directed to systems and methods for monitoring stress cycles and more particularly to systems and methods for counting stress cycles in real-time.

BACKGROUND

Many types of machines and equipment are subjected to stress during operation. For example, a machine may heat up and cool down at different times during operation, resulting in thermal stress. Or a machine may speed up and slow down at different times during operation, resulting in mechanical stress. Over time, such stress can cause result in a decrease in performance or life expectancy of the product; this change in product behavior is hereto referred to as damage.

Stress-related damage to machines and equipment can be costly and hazardous. For example, stress-related damage can cause equipment downtime, performance degradation, safety hazards, maintenance expenses, and/or the like. In the case of vehicles, for example, stress-related damages can cause breakdowns and/or accidents. At the very least, such damage can cause inconvenience to the operator and/or increase the cost of ownership of the vehicle.

Various strategies can be employed to detect and address stress-related damage. One approach is simply to wait for a failure to occur and replace or repair the failed component upon failure. However, this is a risky approach, as equipment failure can pose safety hazards and/or cause more widespread damage than if the problem had been addressed prior to failure. Another approach is to inspect or replace the equipment at regular intervals (e.g., monthly inspections, or inspections after a certain amount of vehicle mileage). These intervals may be based on a "rule of thumb" or other estimation method. Although performing inspections and maintenance frequently may be likely to prevent equipment failure due to stress-related damage, this approach may be inefficient. For example, components may be replaced even when they are not damaged. Moreover, performing regular inspections may be time-consuming and costly.

Accordingly, it would be advantageous to provide improved systems and methods for detecting and/or addressing stress-related damage.

SUMMARY

According to some embodiments, a system for monitoring stress cycles may include a memory storing a base value and an inflection value of a stress cycle and one or more processors coupled to the memory. The one or more processors are configured to receive a series of stress values from a stress sensor. For each stress value in the series of stress values, the one or more processors are configured to perform operations including performing a first comparison between the stress value and a previous stress value in the series of stress values, detecting an inflection in the series of stress values based on the first comparison, updating the base value and the inflection value in response to detecting the inflection, performing a second comparison between the stress value and the base value, determining whether the stress cycle is complete based on the second comparison, and recording the stress cycle in response to determining that the stress cycle is complete.

According to some embodiments, a system for processing a series of stress values in real time may include an inflection detector, a cycle end detector, and a cycle recorder. The inflection detector may be configured to receive a current stress value in the series of stress values and detect an inflection in the series of stress values based on the current stress value. The cycle end detector may be configured to receive the current stress value and detect an end of a stress cycle based on the current stress value. The cycle recorder may be configured to record the stress cycle in response to the cycle end detector detecting the end of the stress cycle.

According to some embodiments, a method for monitoring stress cycles may include receiving a current stress value in a series of stress values, comparing the current stress value to a previous stress value in the series of stress values, detecting an inflection in the series of stress values based on the comparison of the current stress value to the previous stress value, updating a base value and an inflection value of an in-progress stress cycle in response to detecting the inflection, comparing the current stress value to the base value, detecting an end of the in-progress stress cycle based on the comparison of the current stress value to the base value, and recording the in-progress stress cycle in response to detecting the end of the in-progress stress cycle.

Summaries of embodiments are also provided by the claims that follow the description.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTIONS OF THE DRAWINGS

Figure 1:
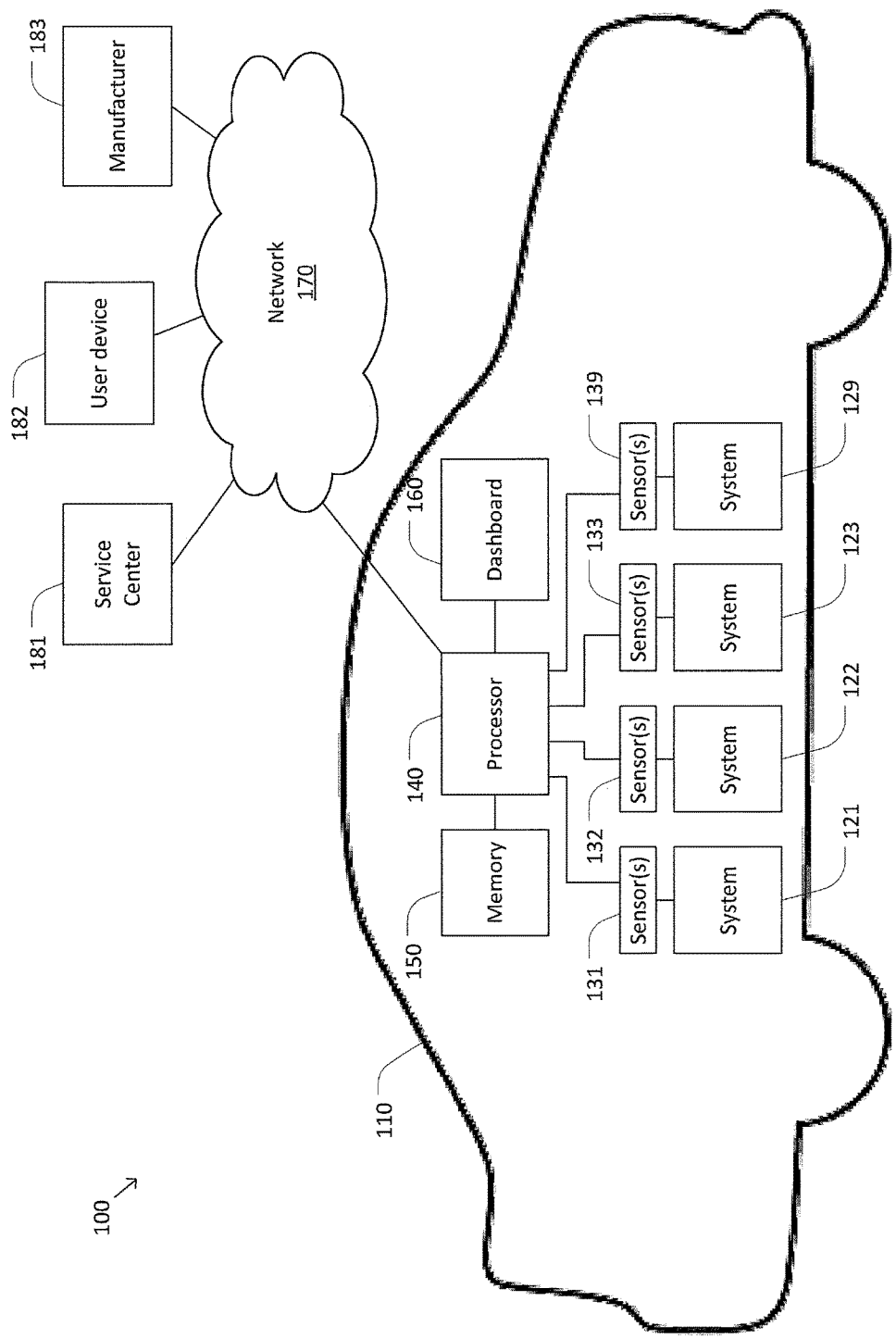
FIG. 1 is a simplified diagram of a system for monitoring stress cycles according to some embodiments.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional. In some instances well known methods, procedures, components, and circuits have not been described in detail so as not to unnecessarily obscure aspects of the embodiments.

Many components of vehicles are subjected to cyclical stresses, such as mechanical stresses caused by speeding up and slowing down, thermal stresses caused by turning the engine on and off, and/or the like. Over time, cyclical stresses cause damage to the vehicle and its sub-components. In order to detect and address this stress-related damage, it is critical to perform regular inspection and maintenance of vehicles. However, even regular inspections may not provide adequate protection against stress-related damage. For example, the inspections may not provide sufficient insight into the characteristics of the stresses imposed on a given component to accurately assess its condition. Moreover, the inspections themselves may be burdensome and costly. Accordingly, it is desirable to provide improved systems and methods for monitoring stress in vehicles.

FIG. 1 is a simplified diagram of a system 100 for monitoring stress cycles according to some embodiments. According to some embodiments, at least a portion of system 100 may be integrated into a vehicle 110. For example, vehicle 110 may include a land vehicle such as a car, motorcycle, or truck, an air vehicle such as an airplane, spacecraft, drone, or satellite, a water vehicle such as a boat or submarine, and/or the like. However, it is to be understood that system 100 can be integrated into virtually any type of machine, including stationary machines. For example, system 100 may be used to monitor stress cycles in industrial equipment, buildings, infrastructure, power generators, stationary energy storage, and/or the like.

In some embodiments, vehicle 110 may include a plurality of subsystems 121-129. For example, subsystems 121-129 may include a battery, a drive unit, a chassis, a steering system, a passenger compartment, electronics, tires, and/or the like. During operation of vehicle 110, subsystems 121-129 may be subjected to various stresses. For example, the stresses may arise from temperature fluctuations, mechanical forces, electrical currents, chemical exposure, and/or the like. Consequently, subsystems 121-129 may be equipped with one or more stress sensors 131-139 that monitor stresses imposed on subsystems 121-129. For example, stress sensors 131-139 may include temperature sensors, mechanical stress sensors, speedometers, accelerometers, torque sensors, electrical current sensors, pressure sensors, and/or the like.

Over time, the stresses may cause damage to subsystems 121-129. When the damage increases above a certain level, it may become necessary to perform maintenance, repair, and/or replacement of subsystems 121-129 and/or components thereof. In some embodiments, the level of damage to subsystems 121-129 may be determined using a cumulative damage model. Some cumulative damage models, such as Miner's rule, estimate damage based on the number and/or characteristics of stress cycles that the subsystem has been subjected to. For example, the estimate may be based on a count of stress cycles, the size of the stress cycles, the duration of the stress cycles, the angle (e.g., peak or valley shape) of the stress cycles, and/or the like.

Accordingly, system 100 may include a processor 140 configured to monitor stress cycles imposed on subsystems 121-129 and/or to determine the cumulative damage to subsystems 121-129. In some examples, processor 140 may control operation and/or execution of hardware and/or software. Although only one processor 140 is shown, system 100 may include multiple processors, CPUs, multi-core processors, field programmable gate arrays (FPGAs), application specific integrated circuits (ASICs), and/or the like. Processor 140 is coupled to a memory 150, which may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

In some embodiments, processor 140 may receive a series of stress values (e.g., a time series of stress values) from one or more of sensors 131-139. Consistent with such embodiments, processor 140 may identify, extract, and/or record stress cycles in the series of stress values. There are a variety of techniques for identifying stress cycles, and/or characteristics thereof, from a series of stress values. For example, in the rain-flow counting technique, peaks and valleys are detected in the series of stress values, and stress cycles are determined based on the sequence and characteristics of the peaks and valleys.

Many techniques for identifying stress cycles, including implementations of the rain-flow counting technique, are performed after the acquisition of the series of stress values. For example, the series of stress values may be received and stored during a data acquisition stage. At a later data processing stage, stress cycles are identified in the stored series of stress values, e.g., by performing operations on the stored series of stress values collectively and/or in batches. Consequently, there is a time delay between receiving the series of stress cycles and identifying stress cycles, which in turn causes a time delay in updating the cumulative damage model. As a result, a damaged subsystem of vehicle 110 may not be identified in time to adequately mitigate the damage. Moreover, the memory requirements for storing the series of stress values can be large. As a result, monitoring stress cycles may be costly and/or infeasible due to the large memory requirements.

To address these challenges, processor 140 may be configured to monitor stress cycles in real-time. For example, processor 140 may identify and record stress cycles concurrently while receiving the series of stress values from stress sensors 131-139. In some embodiments, for each received stress value in the series of stress values, processor 140 may perform one or more operations to determine whether a stress cycle has been completed. When processor 140 detects the end of a stress cycle, processor 140 may record the stress cycle immediately, such that the cumulative damage model can be continuously updated to reflect the latest recorded stress cycle. In some examples, real-time monitoring of stress cycles may be performed without storing the series of stress values in memory 150. For example, rather than storing a complete series of stress values for later data processing, a comparatively small number of stress values may be stored temporarily to track in-progress stress cycles, but other stress values may be discarded as soon as they are received. Accordingly, the amount of memory used during real-time monitoring of stress cycles may be reduced in comparison to alternative approaches.

Figure 2:
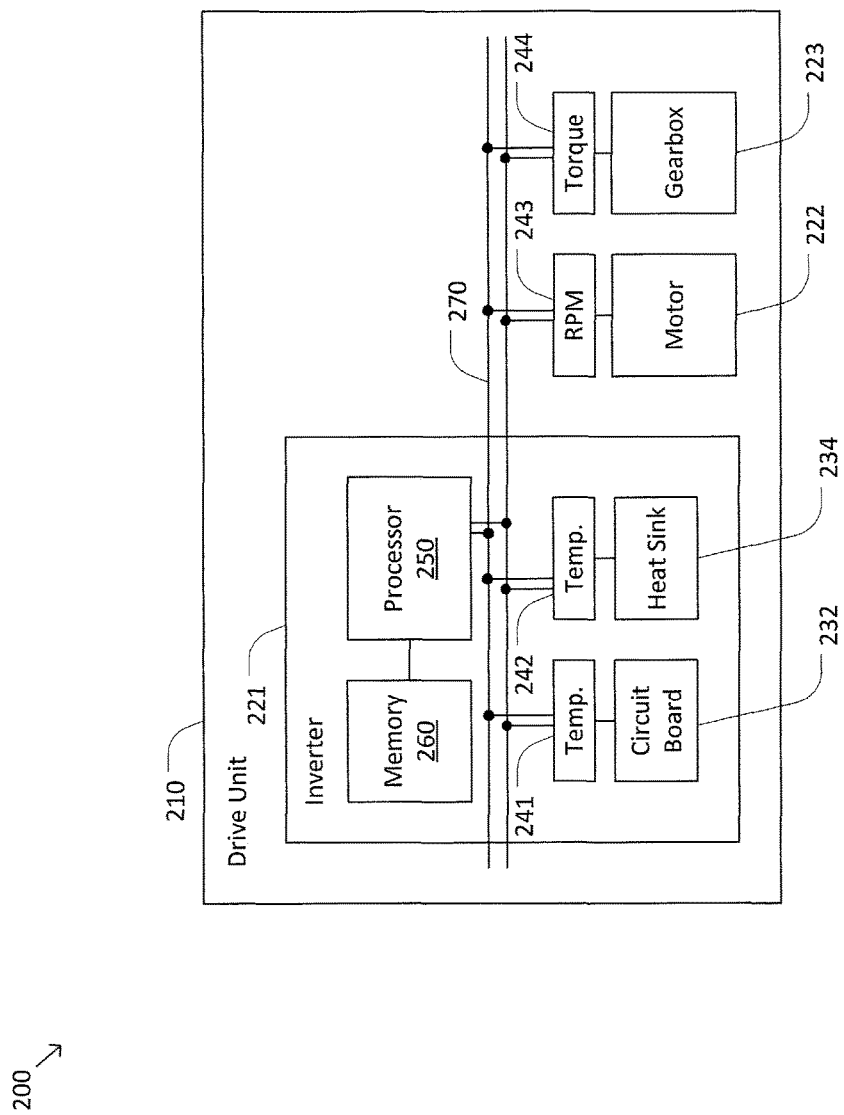
FIG. 2 is a simplified diagram of an embedded system for monitoring stress cycles according to some embodiments.

FIG. 2 illustrates one example of a resource-constrained system in which continuous monitoring of stress cycles may be desired, yet monitoring stress cycles may be costly and/or infeasible using conventional techniques. FIG. 2 is a simplified diagram of an embedded system 200 for monitoring stress cycles according to some embodiments. In some embodiments consistent with FIG. 1, embedded system 200 may be used for monitoring stress cycles in a drive unit 210 of a vehicle, such as vehicle 110. As depicted in FIG. 2, drive unit 210 includes an inverter 221, a motor 222, and a gearbox 223. Inverter 221 includes one or more sub-components, such as a circuit board 232 and a heat sink 234. A plurality of stress sensors 241-244, which generally correspond to stress sensors 131-139, are disposed throughout drive unit 210 to measure various stresses. For example, temperature sensors 241 and 242 measure the temperature of circuit board 232 and heat sink 234, respectively, a tachometer 243 measures the speed (e.g., speed in revolutions per minute (RPM)) of motor 222, and a torque sensor 244 measures the torque on gearbox 223. In certain embodiments, torque sensor 244 measures or otherwise calculates the torque produced at the motor. In other embodiments, additional stress sensors may be provided, such as temperature sensors to measure the temperature of a junction, a busbar, and/or another area susceptible to stress (thermal or other stress) in inverter 221. It is to be understood that these components of drive unit 210 are merely illustrations, and a wide range of alternative configurations of drive unit 210 are possible. Moreover, it is to be understood that embedded system 200 may be used to monitor stress cycles in a wide variety of embedded contexts other than drive unit 210, including non-vehicular contexts, such as industrial equipment, buildings, infrastructure, power generators, stationary energy storage, and/or the like.

In some examples, drive unit 210 may include a processor 250 and a memory 260. For example, processor 250 and memory 260 may be mounted to circuit board 232 of inverter 221. Processor 250 may be communicatively coupled to stress sensors 241-244 via a bus 270. Communication over bus 270 may be performed using a suitable communication protocol, such as a controller area network (CAN) protocol and/or a local interconnect network (LIN) protocol. Processor 250 and memory 260 may generally correspond to processor 140 and memory 150, respectively. In some embodiments, the computing resources of processor 250 and/or memory 260 may be limited. For example, processor 250 may include a microprocessor, microcontroller, digital signal processor, and/or the like. Memory 260 may include on-chip memory of a microcontroller, electrically erasable programmable read-only memory (EEPROM), and/or or the like. In some examples, the capacity of memory 260 may be below 1 megabyte. For example, memory 260 may be a 16-kilobyte EEPROM chip. In light of these limited computing resources, monitoring stress cycles in real-time, as discussed above with reference to FIG. 1, may provide the ability to track stress cycle damage to components that would not otherwise be trackable.

Referring back to FIG. 1, the level of damage associated with one or more of subsystems 121-129 may be updated in response to stress cycles being identified by processor 140. For example, the level of damage may be updated by applying a cumulative damage model using processor 140, another processor of vehicle 110, a processor external to vehicle 110, and/or any suitable combination thereof. In some examples, the level of damage may be updated in real-time when a new stress cycle is identified. For example, processor 140 may feed the newly identified stress cycle directly to the cumulative damage model to adjust the damage estimate in real-time. In other examples, the level of damage may be determined at a later time. For example, processor 140 may record stress cycles into a table, or another suitable data structure, that can later be accessed by and/or exported to the cumulative damage model.

In some embodiments, an operator of vehicle 110 may be notified when damage to subsystems 121-129 is detected. For example, the operator may be alerted when the level of damage reaches a predetermined threshold, such that the operator may take an appropriate remedial action (e.g., bringing vehicle 110 in for maintenance). In one illustrative example, when the level of damage is represented as a damage fraction, the operator may be alerted when the fractional damage to a given subsystem reaches 70%. In some examples, the alert may be communicated to the operator via a dashboard 160 (and/or another suitable control/monitoring interface) of vehicle 110.

In some examples, processor 140 may be coupled to one or more external entities over a network 170. Accordingly, processor 140 may be configured to send stress cycle and/or damage data over network 170 to various recipients. For example, processor 140 may send stress cycle and/or damage data to a service center 181, such that service center 181 may contact the operator to schedule a maintenance appointment when a damaged subsystem is identified. Additionally or alternately, when vehicle 110 is an autonomous vehicle, vehicle 110 may be instructed to drive autonomously to service center 181 for repairs.

In some embodiments, processor may send stress cycle and/or damage data to a user device 182 (e.g., a personal computer, mobile device, etc.). In response, user device 182 may alert the operator to the damaged subsystem and/or provide the operator with a set of options for addressing the damage (e.g., a list of nearby mechanics).

In some embodiments, processor may send stress cycle and/or damage data to a manufacturer 183 (e.g., the manufacturer of vehicle 110), such that manufacturer 183 may use the stress cycle and/or damage data to determine the reliability of subsystems 121-129. In some examples, manufacturer 183 may collect stress cycle and/or damage data from a number of vehicles of a given model in order to determine and/or adjust the parameters of the cumulative damage model, thereby improving the accuracy of the cumulative damage model over time. Manufacturer 183 may then send the updated model parameters back to vehicle 110 to improve the accuracy of the on-board cumulative damage model.

Figure 3A:
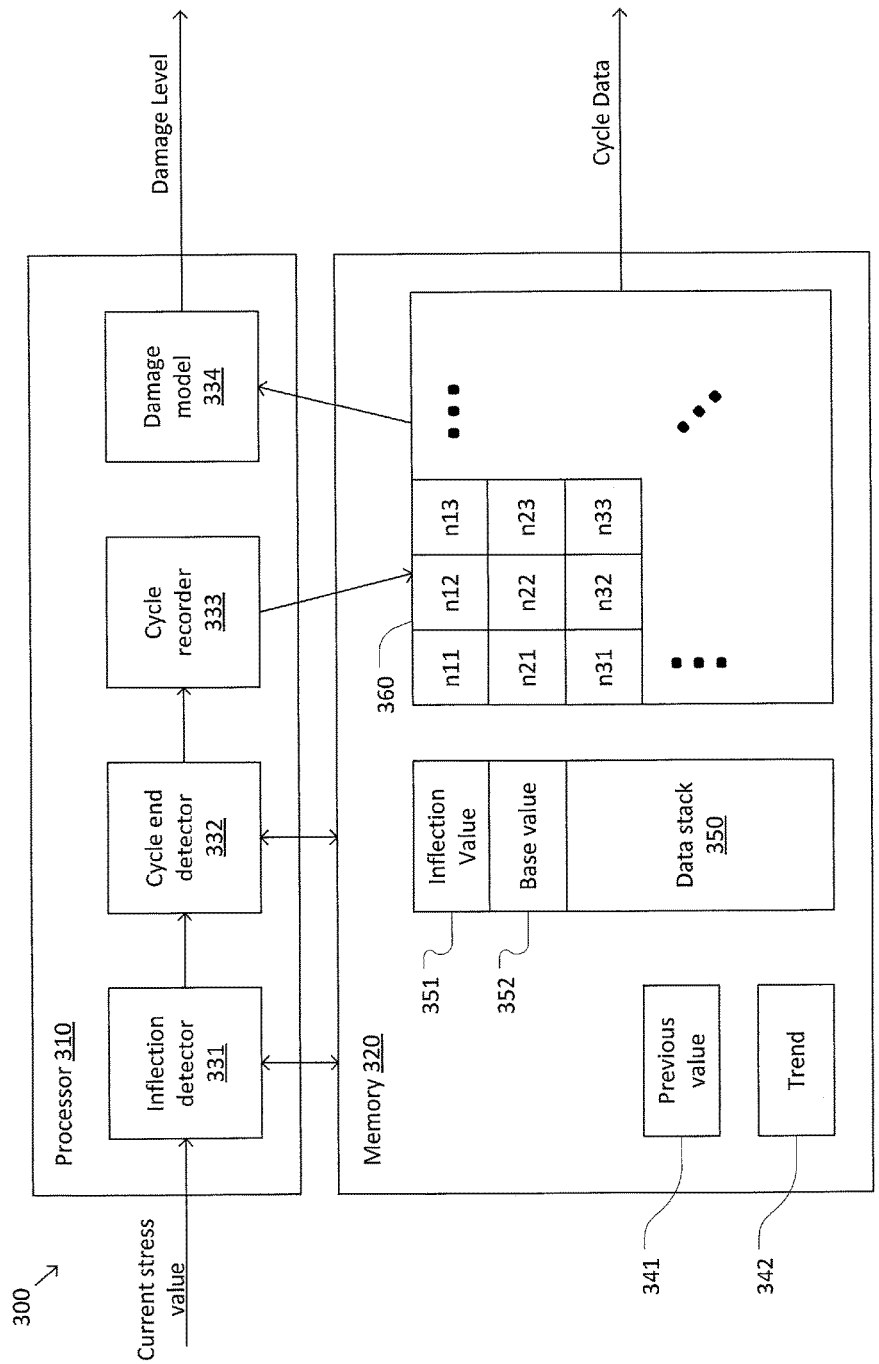
FIGS. 3A-3F are simplified diagrams illustrating various operations performed by a system for monitoring stress cycles according to some embodiments.

FIGS. 3A-3F are simplified diagrams illustrating various operations performed by a system 300 for monitoring stress cycles according to some embodiments. According to some embodiments consistent with FIGS. 1-2, system 300 may include a processor 310 and a memory 320, which generally correspond to processor 140 and/or 250 and memory 150 and/or 260, respectively. As illustrated in FIG. 3A, processor 310 may include a plurality of modules including an inflection detector 331, a cycle end detector 332, a cycle recorder 333, and/or a cumulative damage model 334. In some examples, modules 331-334 may be implemented as electronic circuits, hardware modules, firmware modules, software modules, application program interfaces (API's), and/or the like. Modules 331-334 are configured to access one or more values and/or data structures stored in memory 320, such as a previous value 341, a trend 342, a data stack 350, and cycle data 360.

System 300 is configured to receive a current stress value in a series of stress values from a stress sensor, such as stress sensors 131-139. In some examples, the current stress value may be received directly from the stress sensor, retrieved from a buffer in memory 320, received from a communication bus interface (e.g., a CAN interface), and/or the like. Based on the received stress value, system 300 is configured to identify stress cycles and determine an updated level of damage and/or updated stress cycle data when a stress cycle is identified. In some examples, system 300 may operate in real-time, such that the damage level and/or stress cycle data are continuously updated as each new stress value in the series of stress values is received.

In some examples, system 300 may maintain a data stack 350 to track in-progress stress cycles (i.e., stress cycles that have started, but not been completed, at the time the current stress value is received). For example, data stack 350 may support push and pop operations to respectively add and remove values from the top of data stack 350. The top value of data stack 350 may correspond to an inflection value 351 of an in-progress stress cycle. The second from top value of data stack 350 may correspond to a base value 352 of an in-progress stress cycle. Conditions under which values are pushed and/or popped from data stack 350 are discussed in greater detail below with reference to FIGS. 3B-3E.

In some examples, system 300 may record completed stress cycles in a data table 360. Although data table 360 is described as a tablular data structure, it is to be understood that data table 360 may be represented using any suitable data structure, such as a list, an n-dimensional array, a database, and/or the like. As depicted in FIG. 3A, data table 360 includes a two dimensional array that stores counts of completed cycles that meet predetermined criteria associated with each element of the array. For example, each element may correspond to a number of completed cycles that fall within given ranges of size, duration, peak/valley angle, and/or the like. In general, a larger array corresponds to more granular classification of completed cycles. Increasing the granularity of the classification may increase the accuracy of damage estimation, but also may increase the amount of memory required to store data table 360. Accordingly, the size of data table 360 may be selected based on balancing considerations of accuracy and memory constraints. In an illustrative example, data table 360 may include a 10 by 10 array.

In some examples, system 300 may be configured to detect an inflection (e.g., a peak or valley) in the series of stress values using inflection detector 331. In some examples, inflection detector 331 may determine whether an inflection has occurred by comparing the current stress value to previous value 341 stored in memory 320. For example, when the series of stress values is a time series, previous value 341 may correspond to a previous successive stress value in the time series. Based on the comparison, inflection detector 331 may determine a current trend in the series of stress values (e.g., increasing or decreasing). For example, when the current stress value is greater than previous value 341, the current trend is increasing, and when the current stress value is less than previous value 341, the current trend is decreasing.

To determine whether an inflection has occurred, inflection detector 331 may compare the current trend to trend 342 stored in memory. For example, trend 342 may be a binary value that indicates the previous trend in the series of stress values. When the current trend and trend 342 are in opposite directions (e.g., the current trend is increasing and trend 342 is decreasing, or vice versa), inflection detector 331 may determine that an inflection has occurred. Consistent with such embodiments, inflection detector 331 may detect an inflection by performing one or more Boolean logic operations based on the current stress value. For example, inflection detector 331 may be configured to perform the following Boolean logic operation for each stress value received:

$$I_{t-1} = (S_t > S_{t-1}) \oplus T_{t-1},$$

where $I_{t-1}$ is a binary value that indicates whether previous value 341 is an inflection value, $S_t$ corresponds to the current stress value, $S_{t-1}$ corresponds to previous value 341, and $T_{t-1}$ is a binary value corresponding to trend 342 (e.g., $T_{t-1}$ may be a logical one when the trend is increasing and logical zero when the trend is decreasing).

Figure 3B:
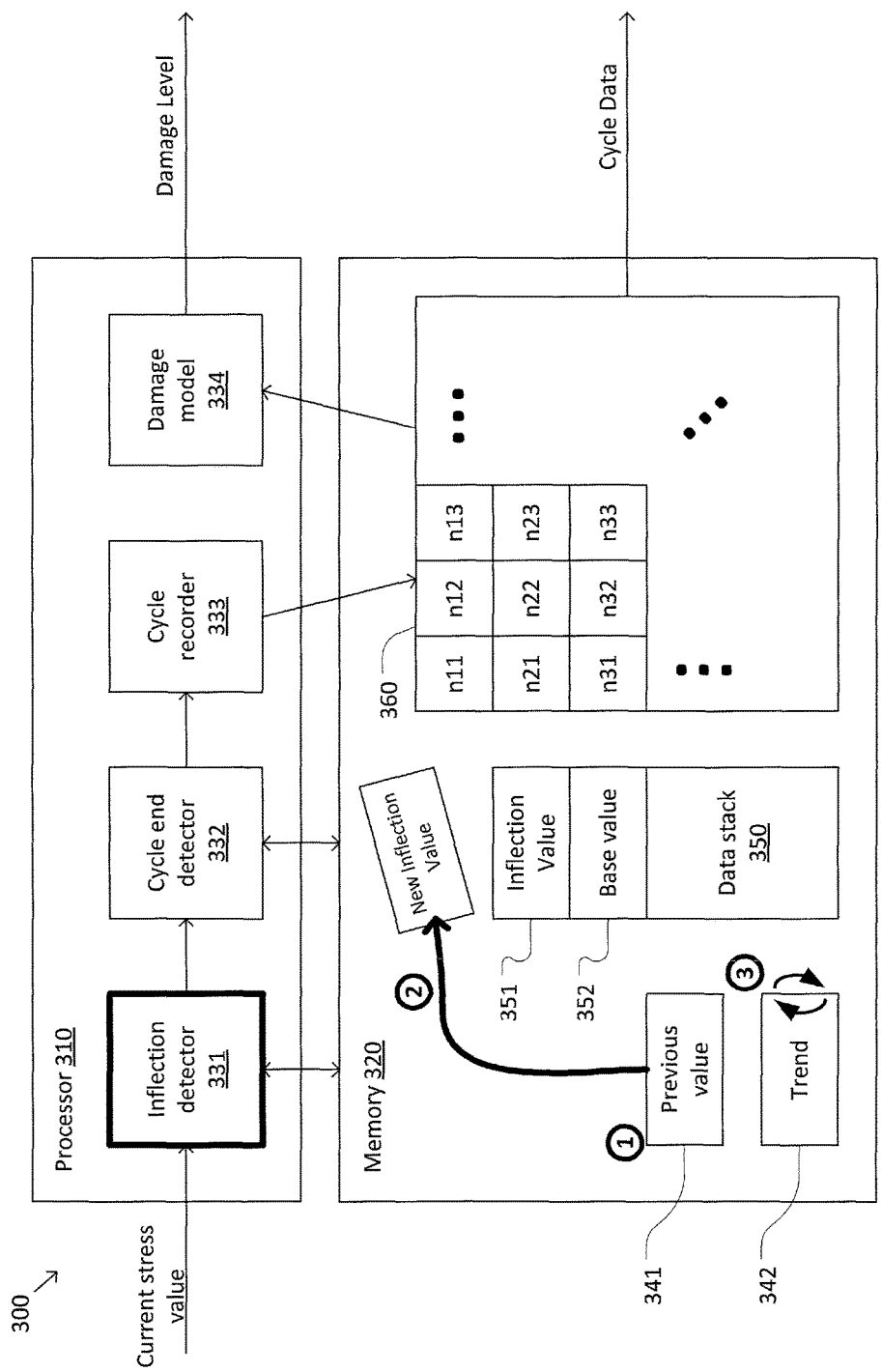

FIG. 3B illustrates a sequence of steps that may occur in response to inflection detector 331 determining that an inflection has occurred. At step 1, inflection detector 331 may determine the value of the inflection (e.g., the maximum value of a peak and/or the minimum value of a valley). In some examples, previous value 341 may be used as the new inflection value. In alternative embodiments, fitting techniques may be used to determine the new inflection value (e.g., fitting a curve to three or more stress values and taking the maximum or minimum of the curve as the inflection value). At step 2, the new inflection value is then pushed onto data stack 350. For example, as depicted in FIG. 3B, previous value 341 is pushed onto data stack 350. At step 3, trend 342 is flipped to indicate that the trend changed at the inflection from increasing to decreasing or vice versa.

In some examples, data stack 350 may have a maximum size. For example, the maximum size may be a predetermined limit and/or a dynamic limit that depends on the available capacity of memory 320. In some examples, the maximum size of data stack may be between 10 and 50 values. When data stack 350 reaches the maximum size, inflection detector 331 may be unable to push a new inflection value onto data stack 350.

Figure 3C:
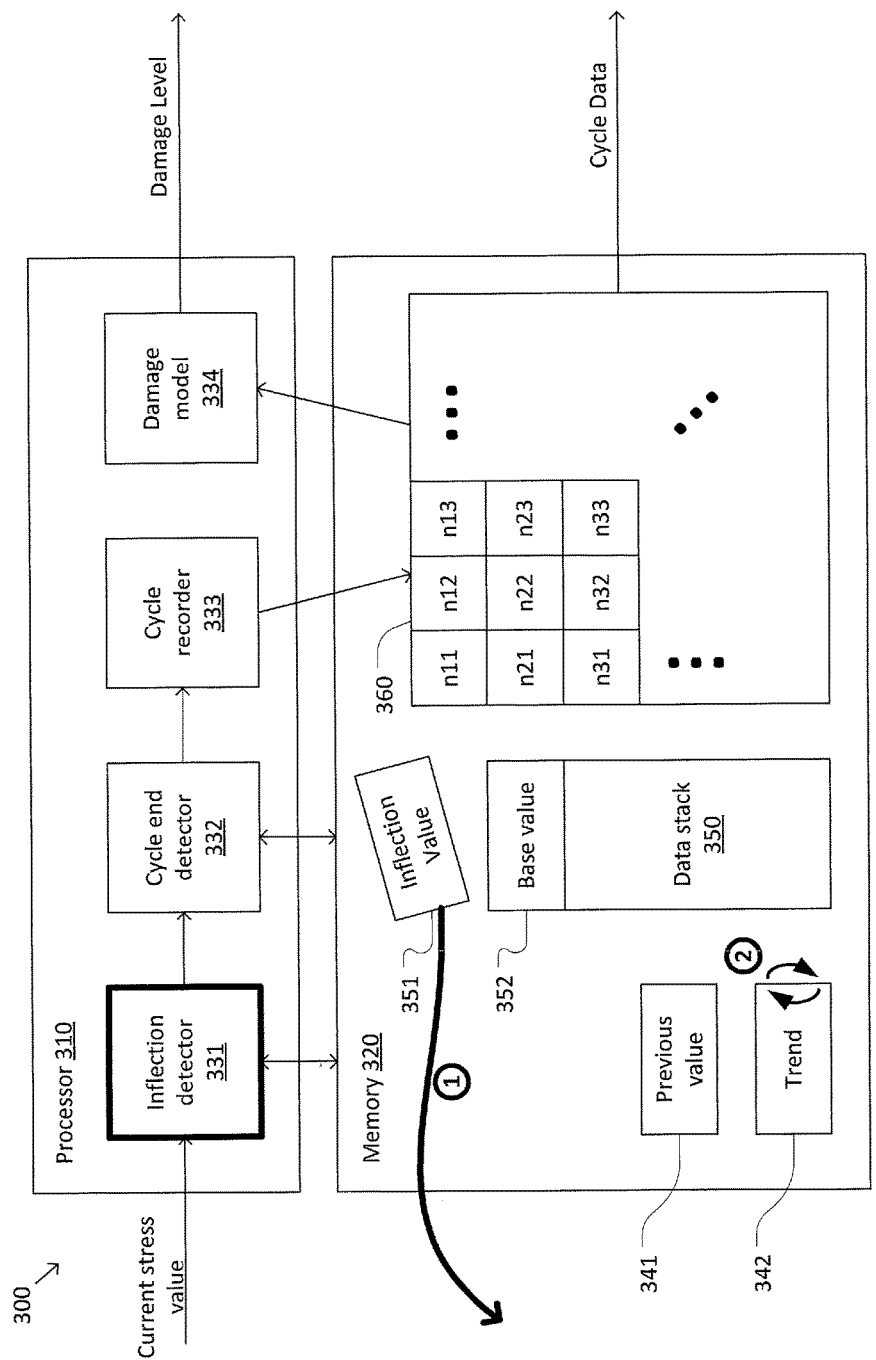

FIG. 3C illustrates a sequence of steps that may occur in response to inflection detector 331 determining that an inflection has occurred when data stack 350 has reached its maximum size. At step 1, the top value of data stack 350 is popped from data stack 350 and discarded. At step 2, trend 342 is flipped to indicate that the trend changed at the inflection from increasing to decreasing or vice versa. The effect of these steps is to revert the state of system 300 to the last time the trend of the series of stress values matched the current trend. Although one or more stress cycles may be discarded as a result of capping the size of data stack 350, the impact on accuracy is generally small because the stress cycles being discarded are those at the top of data stack 350. These stress cycles correspond to the smallest stress cycles and generally have the least impact on the accuracy of the cumulative damage model.

In some embodiments, system 300 may be configured to detect an end of a stress cycle using cycle end detector 332. In some examples, cycle end detector 332 may determine whether an in-progress stress cycle has been completed by determining whether the series of stress values is trending away from base value 352. For example, when the current stress value is greater than base value 352 and trend 342 is increasing, or when the current stress value is less than base value 352 and trend 342 is decreasing, cycle end detector 332 may determine that a stress cycle has been completed. Consistent with such embodiments, cycle end detector 332 may detect the end of a stress cycle by performing one or more Boolean logic operations based on the current stress value. For example, cycle end detector 332 may be configured to perform the following Boolean logic operation for each stress value received:

$$E_t = \overline{(S_t > B_t) \oplus T_t},$$

where $E_t$ is a binary value that indicates whether a stress cycle has been completed, $S_t$ corresponds to the current stress value, $B_t$ corresponds to base value 352, and $T_t$ corresponds to trend 342.

Figure 3D:
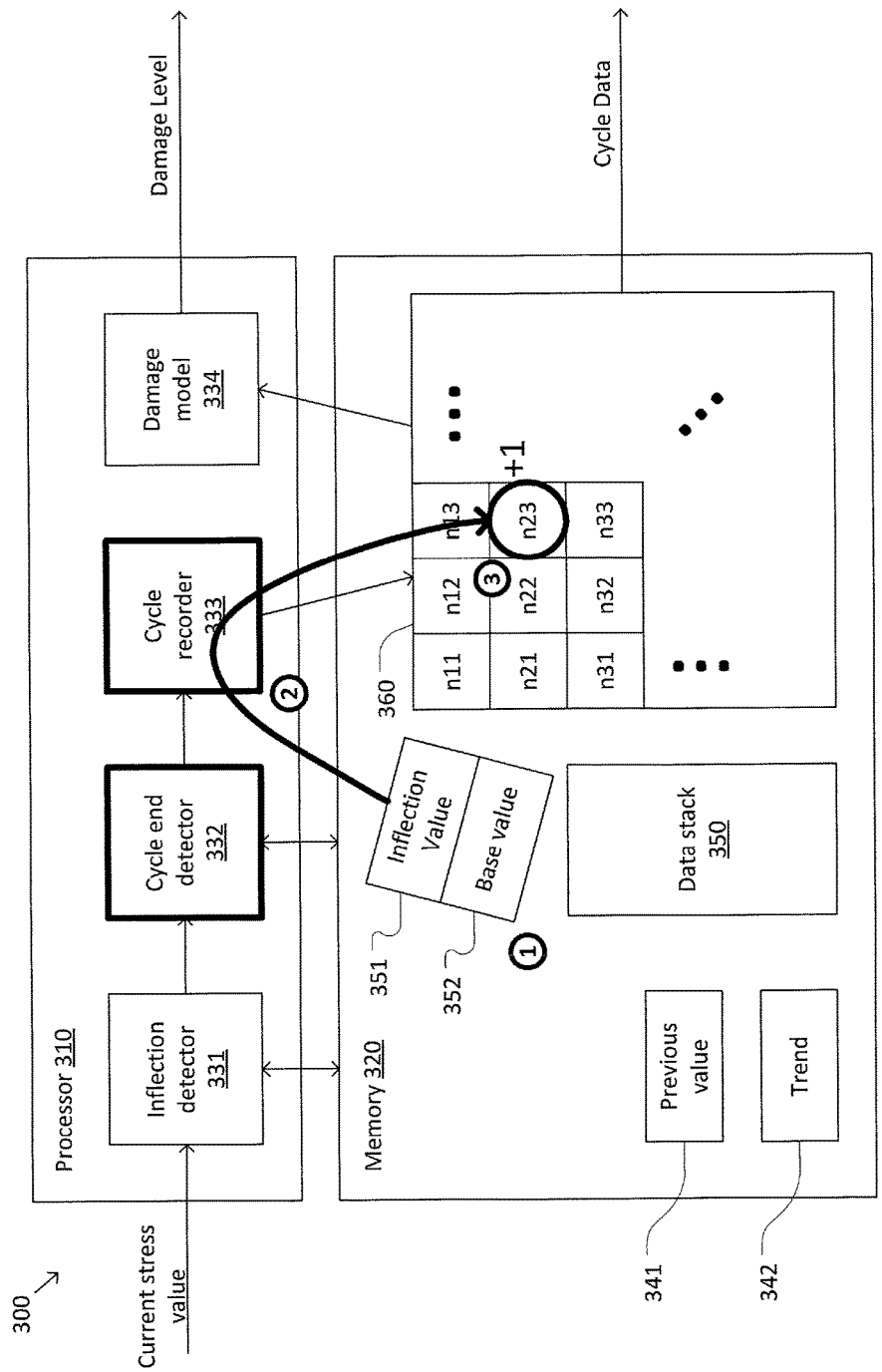

FIG. 3D illustrates a sequence of steps that may occur in response to cycle end detector 332 determining that a stress cycle has been completed. At step 1, cycle end detector 332 may pop inflection value 351 and base value 352 from data stack 350. At step 2, cycle recorder 333 may record the completed stress cycle. For example, cycle recorder 333 may classify the completed stress cycle based on one or more characteristics of the completed stress cycle, such as inflection value 351, base value 352, duration, peak/valley angle, and/or the like. In the example depicted in FIG. 3D, cycle recorder 333 determines that the completed stress cycle belongs to the classification corresponding to the second row and third column of data table 360. Consequently, at step 3, cycle recorder 333 increments the corresponding counter of cycle data 360 by one. In some embodiments, cycle recorder 333 may perform filtering to determine whether the completed stress cycle meets a predetermined threshold prior to recording the stress cycle. For example, stress cycles below a predetermined size may have a negligible impact on determining the level of damage and may be discarded by cycle recorder 333.

Figure 3E:
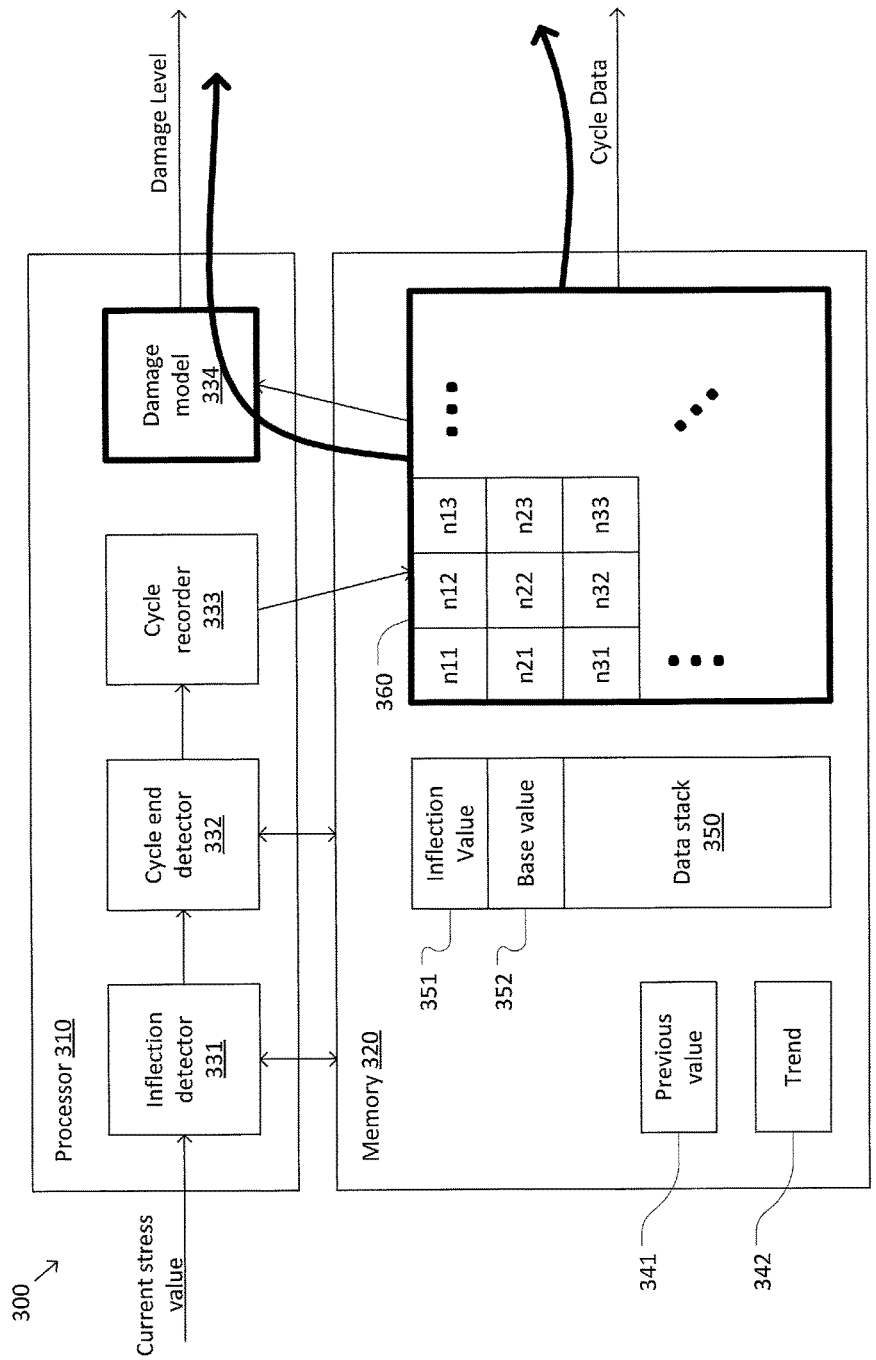

In some examples, system 300 may be configured to update the level of damage based on changes to data table 360 using damage model 334. Additionally or alternatively, system 300 may export data table 360 for processing outside of system 300. Consistent with such embodiments, damage model 334 may be omitted from system 300. In various embodiments, damage model 334 may apply Miner's rule to data table 360 to determine the level of damage. In some examples, damage model 334 may operate continuously (e.g., each time cycle data 360 changes) to provide real-time updates to the level of damage. In some examples, damage model 334 may determine whether the level of damage is above a predetermined threshold and trigger an alert when the damage threshold has been met. FIG. 3E illustrates processes of updating the damage level using damage model 334 and/or exporting data table 360 based on changes to data table 360.

In some examples, system 300 may be configured to perform an instant update to the damage level in response to determining a completed stress cycle. To perform an instant update, damage model 334 may be adapted to determine the level of damage without accessing historical cycle data stored in data table 360. For example, damage model 334 may determine the level of damage based on the current damage level and the newly completed stress cycle. When the instant update is performed, data table 360 may be omitted.

Figure 3F:
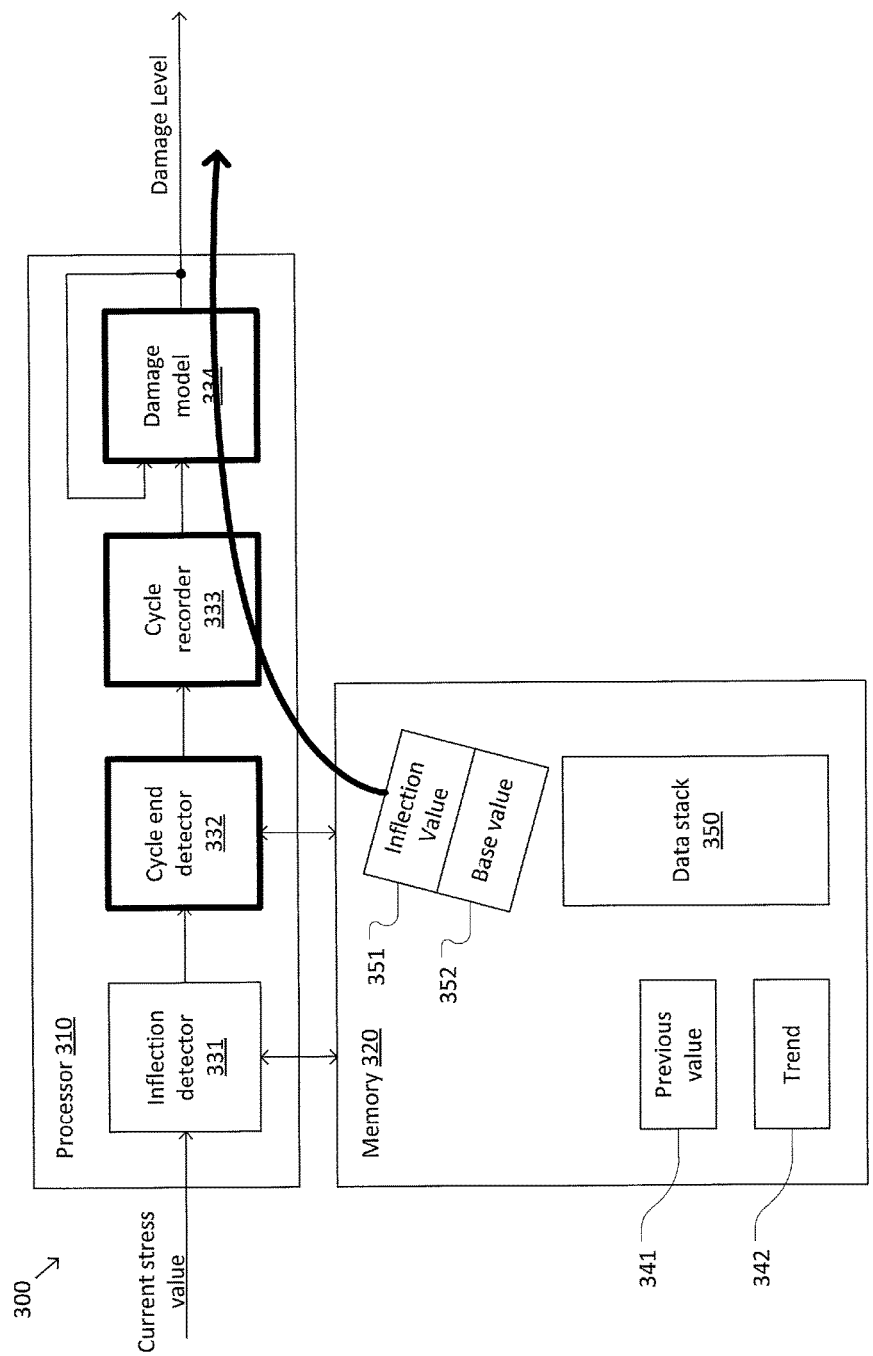

FIG. 3F illustrates a sequence of steps that may occur in response to cycle end detector 332 determining that a stress cycle has been completed when system 300 is configured for instant updates. At the end of the stress cycle, cycle end detector 332 pops inflection value 351 and base value 352 from data stack 350, cycle recorder 333 determines one or more characteristics of the completed stress cycle, and damage model 334 updates the damage level based on the current damage level and the completed stress cycle. Because damage model 334 does not access data table 360 in this embodiment, data table 360 is omitted.

Figure 4A:
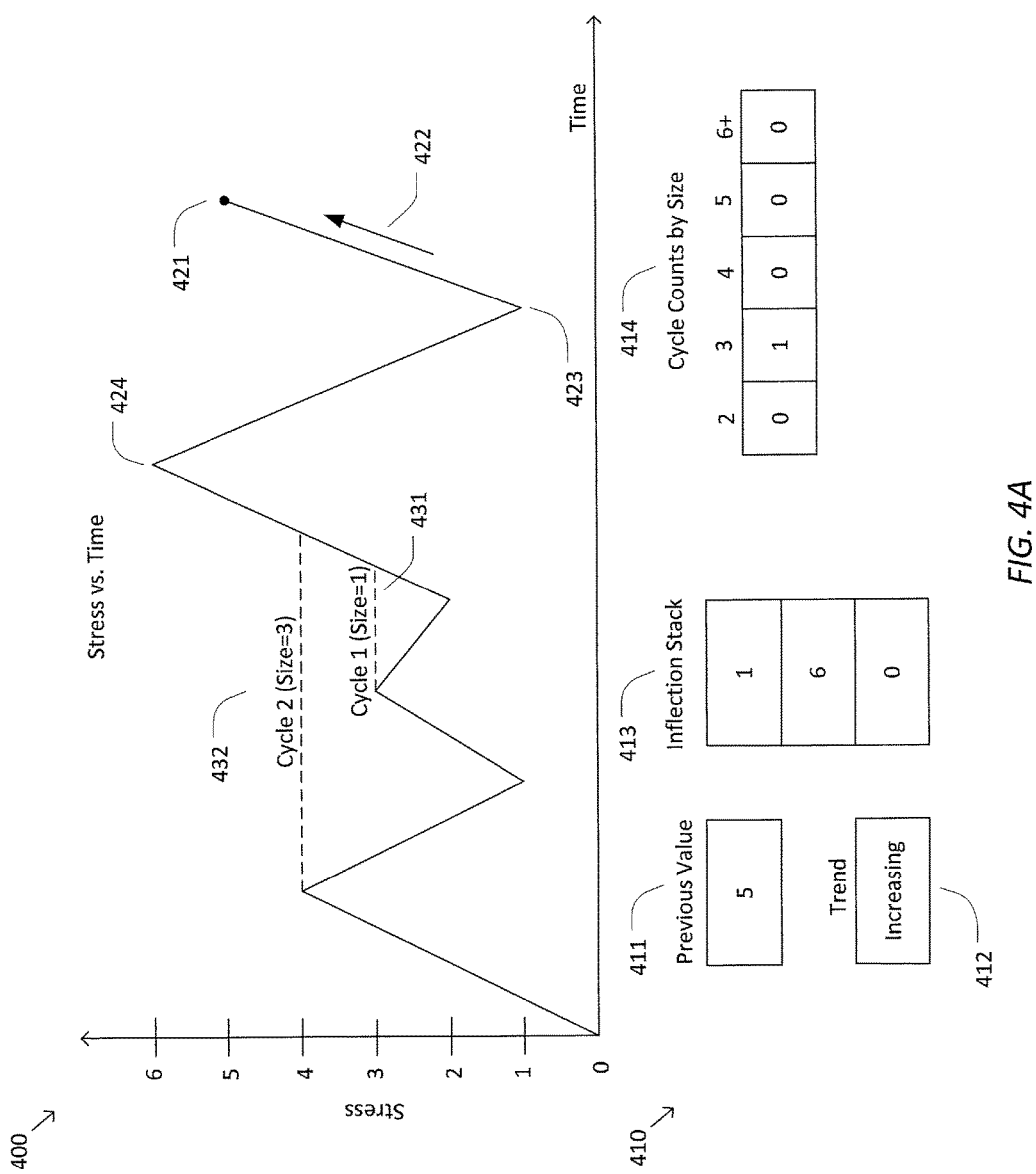
FIGS. 4A-4C are simplified diagrams of a time series of stress values and corresponding state variables of a stress cycle monitoring system according to some embodiments.
Figure 4B:
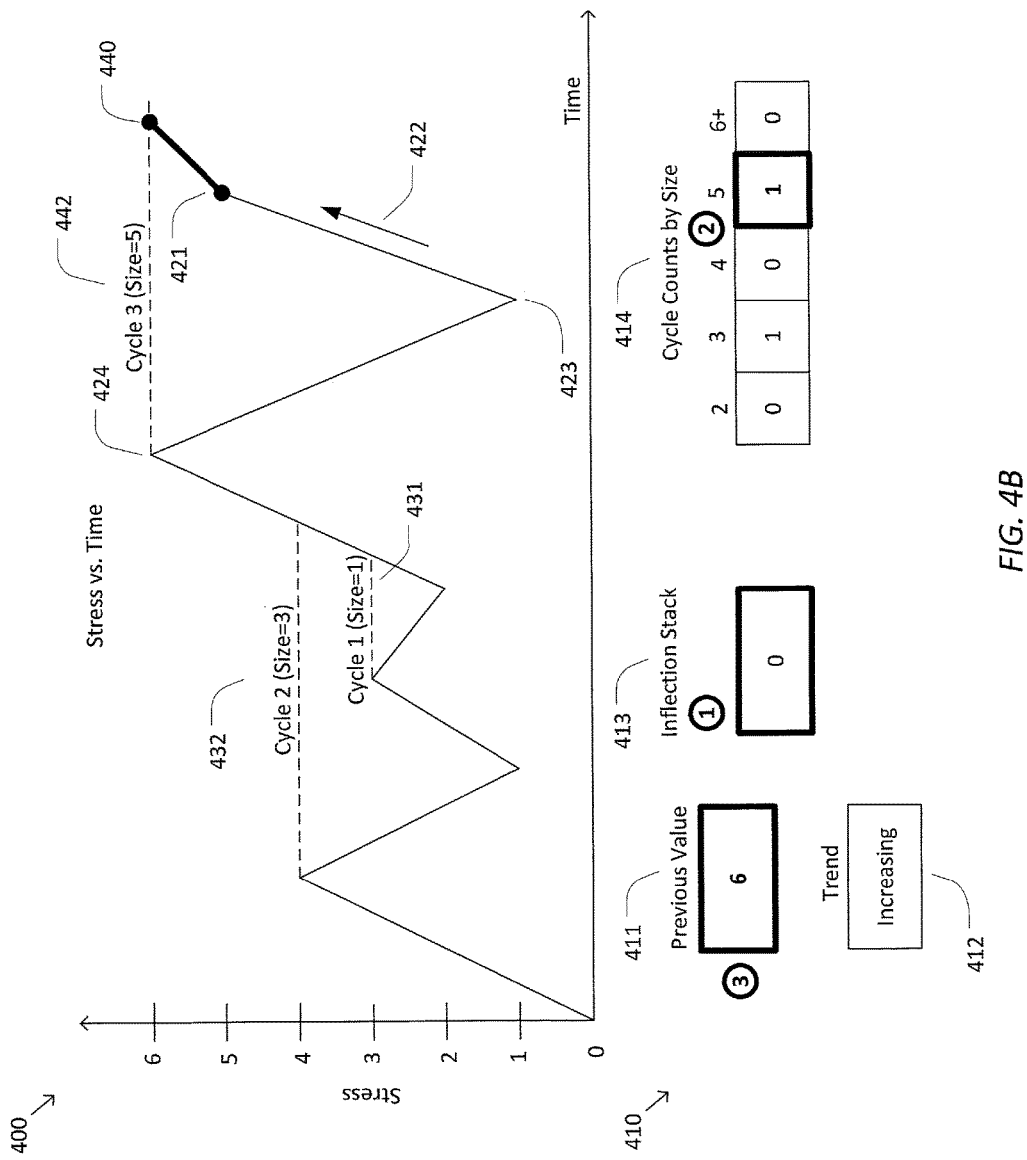
Figure 4C:
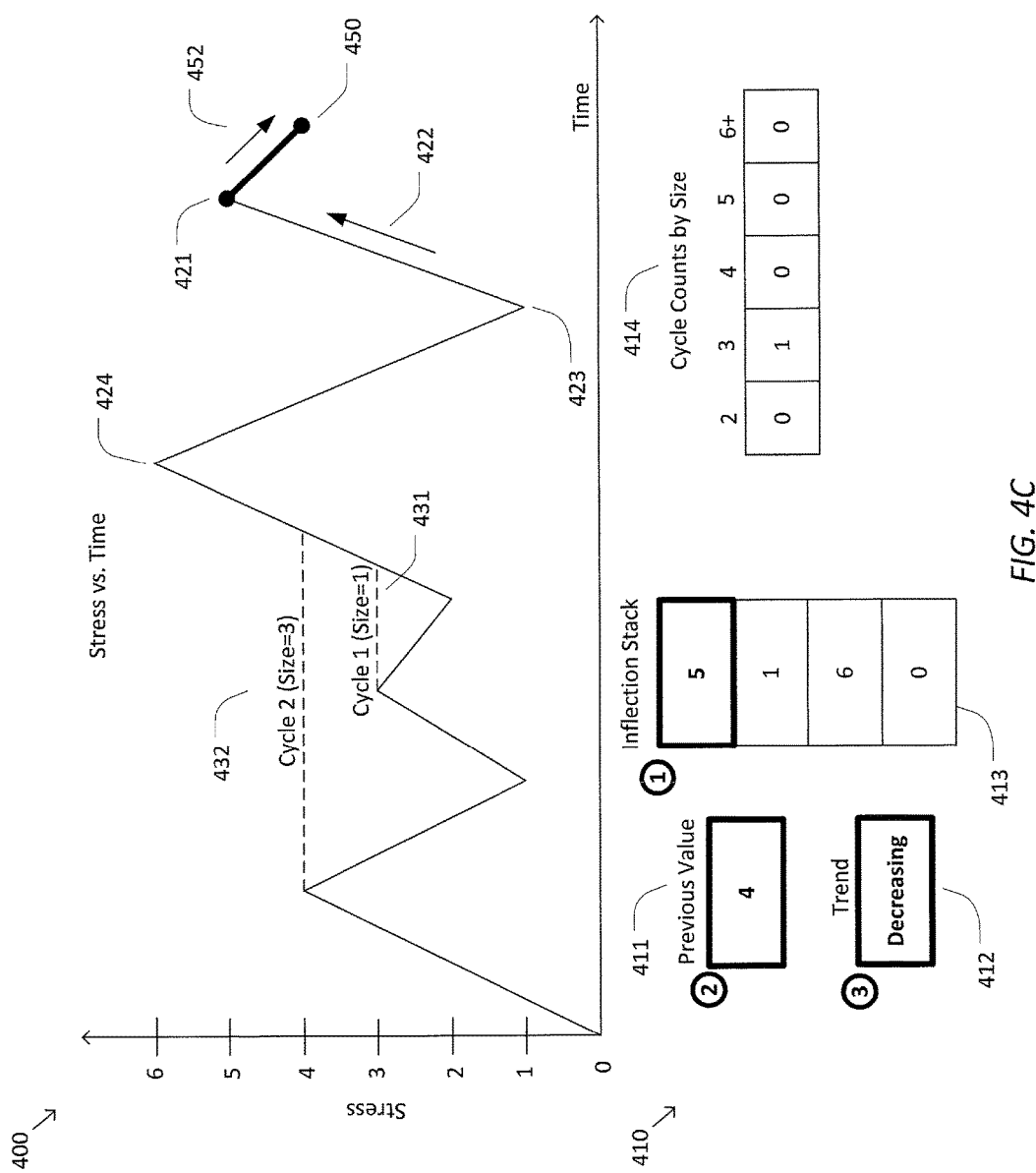

FIGS. 4A-4C are simplified diagrams of a time series 400 of stress values and corresponding state variables 410 of a stress cycle monitoring system according to some embodiments. In some embodiments consistent with FIGS. 1-3F, the stress cycle monitoring system may correspond to systems 100-300.

In some examples, state variables 410 may include a previous value 411, a trend 412, an inflection stack 413, and/or a cycle count 414. These variables may generally correspond to previous value 341, trend 342, data stack 350, and/or data table 360, respectively, as described above respect to FIGS. 3A-3F. As depicted in FIG. 4A, previous value 411 corresponds to a most recent value 421 in time series 400, which in this example is five. Trend 412 corresponds to a most recent trend 422 in time series 400, which in this example is increasing. Inflection stack 413 includes a top value that corresponds to an inflection value 422 of an in-progress stress cycle in time series 400, which in this example is one. Inflection stack 413 further includes a second from top value that corresponds to a base value 424 of the in-progress stress cycle, which in this example is six.

Cycle count 414 includes a plurality of counters corresponding to different cycle sizes. The size of a stress cycle corresponds to the difference between the base value and inflection value of the stress cycle. In this example, stress cycles with a size of less than two are not counted. Two previously completed stress cycles are depicted in time series 400. As depicted in FIG. 4A, a first completed stress cycle 431 has a base value of three and an inflection value of two, so the size of the first completed stress cycle is one. Accordingly, first completed stress cycle 431 is too small to be included in the cycle count 414. A second completed stress cycle 432 has a base value of four and an inflection value of one, so the size of second completed stress cycle 432 is three. Accordingly, the count of stress cycles with a size of three is one.

FIG. 4B illustrates changes to state variables 410 in response to receiving a new stress value 440 in time series 400. In this example, the new stress value 440 is six, which matches the base value 424 of the in-progress stress cycle. Consequently, a new stress cycle 442 (with a size of five) is completed. As a result, state variables 410 undergo the following changes: (1) inflection stack 413 is updated by popping the top two values from inflection stack 413, (2) cycle count 414 is updated to reflect stress cycle 442, and (3) previous value 411 is updated based on new stress value 440.

FIG. 4C illustrates changes to state variables 410 in response to receiving a new stress value 450 in time series 400. In this example, the new stress value 450 is four, which is less than previous value 421. Accordingly, new stress value 450 reflects a decreasing trend 452 in time series 400. Because trends 452 and 422 are in opposite directions, an inflection in time series 400 is detected. In particular, previous value 421 is determined to correspond to a peak of time series 400. As a result, state variables 410 undergoes the following changes: (1) inflection stack 413 is updated by pushing previous value 421 onto inflection stack 413, (2) previous value 411 is updated based on new stress value 450, and (3) trend 412 is updated based on trend 452.

Figure 5:
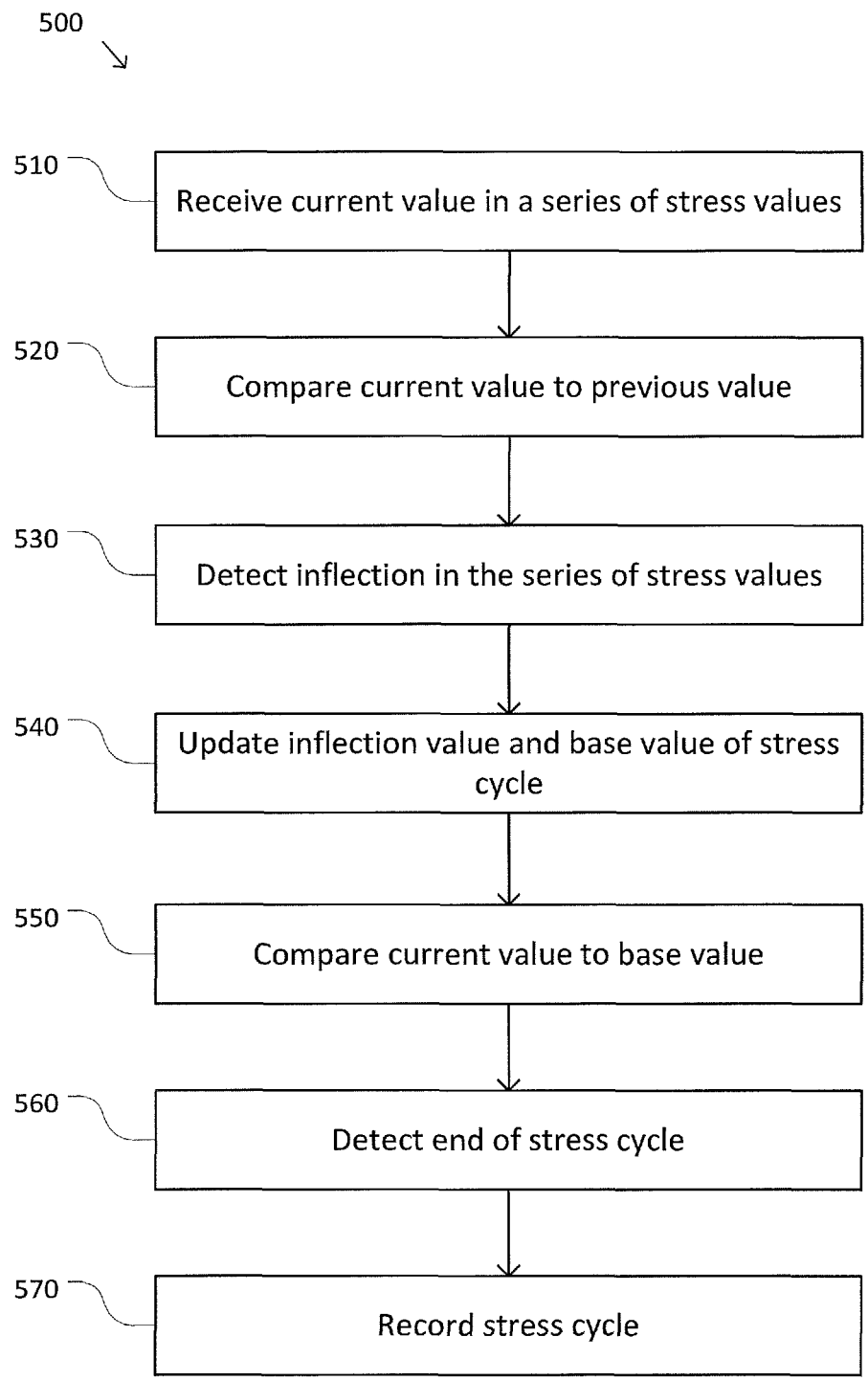
FIG. 5 is a simplified diagram of a method 500 for monitoring stress cycles according to some embodiments.

FIG. 5 is a simplified diagram of a method 500 for monitoring stress cycles according to some embodiments. According to some embodiments consistent with FIGS. 1-4C, method 500 may be performed by one or more processors, such as processors 140, 250, and/or 310. In some examples, the one or more processors may correspond to an embedded system, such as embedded system 200. For example, the embedded system may correspond to an automotive embedded system, such as a system and/or subsystem of vehicle 110. In various embodiments, each process of method 500 may be performed by and/or within the embedded system, e.g., on-board vehicle 110. In some embodiments, method 500 may be performed in real-time and/or without storing large amounts of stress data other than state variables, such as state variables 410. Note that the processes described herein may be omitted, combined, or performed in a different sequence as needed or desired.

At a process 510, a current value in a series of stress values, such as time series 400, is received. In some examples, the series of stress values may be received from a stress sensor, such as stress sensors 131-139. Examples of stress values include electrical current measurements, temperature measurements, speed measurements, torque measurements, and/or the like. In some examples, the series of stress values may be received via a communication bus, such as bus 270. For example, the communication bus may correspond to a CAN bus.

At a process 520, the current value is compared to a previous value in the series of stress values. In some examples, the previous value may correspond to a previous successive value in the series of stress values. Based on the comparison, a trend (e.g., an increasing or decreasing trend) in the series of stress values may be determined.

At a process 530, an inflection in the series of stress values is detected. In some examples, the inflection may correspond to a peak and/or valley in the series of stress values. In some examples, the inflection may be detected by comparing a trend determined at process 520 to a previous trend. When the trend determined at process 520 and the previous trend are in opposite directions (e.g., one is increasing and the other is decreasing), it may be determined that an inflection has occurred in the series of stress values. When an inflection is detected at process 530, method 500 may proceed to a process 540 for updating an inflection value and a base value of a stress cycle. When an inflection is not detected at process 530, method 500 may bypass process 540 and proceed to a process 550 for comparing the current value to the base value.

At process 540, an inflection value and a base value of a stress cycle are updated in response to detecting an inflection in the series of stress values at process 530. In some examples, the stress cycle may correspond to an in-progress stress cycle. That is, the stress cycle has a starting or base value and an inflection (e.g., peak or valley) value, but has not yet returned to the base value to complete the stress cycle. In some examples, updating the inflection and base value of the stress cycle may include pushing the previous value onto a data stack, such as data stack 350 and/or inflection stack 413. The top two values of the data stack may correspond to the inflection value and base value, respectively. Accordingly, pushing the previous value onto the data stack may cause the previous value to become the updated inflection value, and the previous inflection value (i.e., the value previously positioned at the top of the data stack) to become the updated base value.

At process 550, the current value is compared to the base value of the stress cycle. In some examples, the base value may be determined by accessing the second element from the top of the data stack.

At a process 560, the end of the stress cycle is detected. In some examples, the end of the stress cycle may be detected based on the comparison between the current value and the base value in conjunction with the trend of the series of stress values. For example, it may be determined that the stress cycle is complete when (a) the current value is greater than the base value and the trend is increasing, and/or (b) the current value is less than the base value and the trend is decreasing. When it is determined that the stress cycle is complete, method 500 may proceed to a process 570 for recording the completed stress cycle. When it is not determined that the stress cycle is complete, method 500 may terminate and/or return to process 510 to receive the next value in the series of stress values.

At process 570, the stress cycle is recorded in response to detecting the end of the stress cycle at process 560. In some examples, recording the stress cycle may include popping the top two values from the data stack corresponding to the base value and inflection value of the stress cycle. In some examples, recording the stress cycle may include determining one or more characteristics of the stress cycle, such as the base value, inflection value, mean value, range or size, duration, peak/valley angle, and/or the like. In some examples recording the stress cycle may include classifying the stress cycle based on its characteristics and updating a counter corresponding to that classification. For example, the counter may be stored as an element in a data table, such as data table 360, to identify the number of stress cycles that have occurred that match a given classification. In some examples, the stress cycle may be filtered out at process 570 when one or more predetermined thresholds are not satisfied. For example, the stress cycle may be discarded when it does not meet a minimum size threshold.

In some embodiments, recording the stress cycle may include and/or may be followed by updating a damage level based on the stress cycle. For example, a cumulative damage model may access the data table to update the damage level based on the stress cycle. In certain embodiments, the stress cycle may be passed directly to the cumulative damage model, bypassing the data table, to perform an instant update to the damage level. In one or more embodiments, the damage level may be continuously updated in real-time for each stress cycle recorded during method 500.

Some examples of processors, such as processors 140, 250, and/or 310, may include non-transient, tangible, machine readable media that include executable code that when run by one or more processors (e.g., processors 140, 250, and/or 310) may cause the one or more processors to perform the processes of method 500. Some common forms of machine readable media that may include the processes of method 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for monitoring stress cycles, the system comprising:
   a memory storing a base value and an inflection value of a stress cycle; and
   one or more processors coupled to the memory and configured to receive a series of stress values of the stress cycle from a stress sensor, wherein the one or more processors are configured to perform operations comprising:
   performing a first comparison between a first stress value and a previous stress value in the series of stress values;
   detecting an inflection in the series of stress values of the stress cycle based on the first comparison;
   updating the inflection value to be the previous stress value in response to the detecting the inflection;
   performing a second comparison between a second stress value in the series of stress values and the base value;
   determining that the stress cycle is complete based on the second comparison; and
   recording the stress cycle in response to the determining that the stress cycle is complete.

2. The system of claim 1, wherein the one or more processors are configured to perform the operations in real-time as each stress value is received.

3. The system of claim 1, wherein the base value and the inflection value are stored in a data stack in the memory, the data stack supporting push and pop operations, and wherein the inflection value is positioned at a top of the data stack and the base value is positioned second from the top of the data stack.

4. The system of claim 3, wherein the operations further comprise pushing the previous stress value onto the data stack.

5. The system of claim 3, wherein the operations further comprise popping the inflection value and the base value from the data stack when the stress cycle is complete.

6. The system of claim 3, wherein the operations further comprise:
   determining that the data stack is at a maximum size; and
   popping the inflection value from the data stack in response to the detecting the inflection and the determining that the data stack is at the maximum size.

7. The system of claim 1, wherein the detecting the inflection in the series of stress values includes determining that (a) the first stress value is greater than the previous stress value and a trend of the series of stress values is decreasing or (b) the first stress value is less than the previous stress value and the trend of the series of stress values is increasing.

8. The system of claim 1, wherein the determining that the stress cycle is complete includes determining that (a) the second stress value is less than the base value and a trend of the series of stress values is decreasing or (b) the second stress value is greater than the base value and the trend of the series of stress values is increasing.

9. The system of claim 1, wherein:
   the memory further stores a trend indicator that indicates whether a trend of the series of stress values is increasing or decreasing; and
   the operations further comprise flipping the trend indicator in response to the detecting the inflection.

10. The system of claim 1, wherein the recording the stress cycle includes:
    determining a classification of the stress cycle based on at least one of the base value of the stress cycle, the inflection value of the stress cycle, a duration of the stress cycle, or an angle of the stress cycle; and
    incrementing a counter corresponding to the classification of the stress cycle.

11. The system of claim 1, wherein the system is an embedded system on board a vehicle.

12. A system for processing a series of stress values of a stress cycle in real time, the system comprising:
    an inflection detector configured to receive a first stress value in the series of stress values and detect an inflection in the series of stress values based on a comparison between the first stress value and a previous stress value;
    a cycle end detector configured to receive a second stress value and detect an end of the stress cycle based on a comparison between the second stress value and a base value; and
    a cycle recorder configured to record the stress cycle in response to the cycle end detector detecting the end of the stress cycle.

13. The system of claim 12, wherein the inflection detector is configured to further detect the inflection based on a change in a trend of the series of stress values.

14. The system of claim 12, wherein, in response to detecting the inflection, the inflection detector:
    determines an inflection value of the inflection; and
    pushes the inflection value onto an inflection stack.

15. The system of claim 12, wherein the cycle end detector is configured to detect the end of the stress cycle based, at least in part, on the series of stress values trending away from a base value of the stress cycle.

16. The system of claim 12, wherein, in response to the cycle end detector detecting the end of the stress cycle, the cycle recorder:
    pops a first value and a second value from an inflection stack;
    determines one or more characteristics of the stress cycle based on the first value and the second value;
    determines a classification of the stress cycle based on the one or more characteristics; and
    increments a counter based on the classification.

17. The system of claim 12, further comprising a damage model configured to determine a damage level in response to the cycle recorder recording the stress cycle, the damage level being determined by applying a cumulative damage model based on a count of stress cycles in the series of stress values.

18. A method for monitoring stress cycles, the method comprising:
    receiving a first stress value in a series of stress values;
    comparing the first stress value to a previous stress value in the series of stress values;
    detecting an inflection in the series of stress values based on the comparing the first stress value to the previous stress value;
    updating an inflection value of an in-progress stress cycle in response to the detecting the inflection;
    receiving a second stress value in the series of stress values;
    comparing the second stress value to the base value;
    detecting that the second stress value matches the base value;
    based on the detecting that the second stress value matches the base value, determining that the in-progress stress cycle has ended; and
    recording the in-progress stress cycle in response to the determining that the in-progress stress cycle has ended.

19. The method of claim 18, further comprising updating a level of damage in response to the recording the in-progress stress cycle, wherein the level of damage is updated using a cumulative damage model.

20. The method of claim 18, wherein the in-progress stress cycle is recorded in a data table that stores counts of completed stress cycles of the series of stress values.

* * * * *